(12) United States Patent
Ciubotariu et al.

(10) Patent No.: US 11,704,408 B1
(45) Date of Patent: Jul. 18, 2023

(54) THREAT SCANNING TRANSPLANTED CONTAINERS

(71) Applicant: Amazon Technologies, Inc., Seattle, WA (US)

(72) Inventors: Mircea Ciubotariu, Culver City, CA (US); Muhammad Wasiq, Surrey (CA); Shane Anil Pereira, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 56 days.

(21) Appl. No.: 17/364,440

(22) Filed: Jun. 30, 2021

(51) Int. Cl.
*G06F 21/00* (2013.01)
*G06F 21/56* (2013.01)
*G06F 21/57* (2013.01)
*G06F 9/455* (2018.01)

(52) U.S. Cl.
CPC .......... *G06F 21/565* (2013.01); *G06F 21/577* (2013.01); *G06F 9/45558* (2013.01); *G06F 2009/45587* (2013.01); *G06F 2221/034* (2013.01)

(58) Field of Classification Search
CPC ..... G06F 2221/034; G06F 2009/45587; G06F 9/45558; G06F 21/577; G06F 21/565

USPC .......................................................... 726/23
See application file for complete search history.

(56) References Cited

U.S. PATENT DOCUMENTS

| | | | |
|---|---|---|---|
| 9,268,689 B1* | 2/2016 | Chen | G06F 21/53 |
| 10,915,628 B2* | 2/2021 | Stopel | G06F 21/566 |
| 11,372,811 B1* | 6/2022 | Ciubotariu | G06F 21/565 |
| 2018/0255087 A1* | 9/2018 | Antony | G06F 21/53 |
| 2018/0309747 A1* | 10/2018 | Sweet | G06F 9/45558 |
| 2020/0082094 A1* | 3/2020 | Mcallister | G06F 8/77 |
| 2020/0193016 A1* | 6/2020 | Zeng | G06F 11/301 |
| 2021/0320592 A1* | 10/2021 | Danilak | H02M 3/33507 |

* cited by examiner

*Primary Examiner* — Josnel Jeudy
(74) *Attorney, Agent, or Firm* — Nicholson De Vos Webster & Elliott, LLP

(57) ABSTRACT

Techniques for threat scanning transplanted containers are described. A method of threat scanning transplanted containers may include generating a container map of running containers on a block storage volume mounted to a scanning instance of a threat scanning service, scanning the block storage volume by a scanning engine of the scanning instance, identifying at least one threat on the block storage volume, and identifying at least one container associated with the at least one threat using the container map.

20 Claims, 8 Drawing Sheets

US 11,704,408 B1

THREAT SCANNING TRANSPLANTED CONTAINERS

BACKGROUND

Many companies and other organizations operate computer networks that interconnect numerous computing systems to support their operations. For example, data centers housing significant numbers of interconnected computing systems have become commonplace. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources. Virtualization technologies, for example, may allow a single physical computing machine to be shared among multiple users by providing each user with one or more virtual machines hosted by the single physical computing machine. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

A recently popular virtualization technology is application containerization. At a high level, containers are a method of operating system virtualization that allow users to run software applications and their dependencies in resource-isolated processes and in a consistent manner across different deployment environments. To enable container-based applications to run consistently across various deployment environments, a container is constructed as an atomic, self-contained package of software that includes everything needed to run the software contained therein (that is, a container includes any necessary code, runtime, libraries, packages, and so forth). The use of containers has become a popular application development and deployment tool in part because containers generally are portable, lightweight, standardized, and easy to deploy in a consistent manner regardless of deployment environment. As containers gain more popularity, it is important to provide adequate security for the applications running inside them and the services that utilize them.

BRIEF DESCRIPTION OF DRAWINGS

Various embodiments in accordance with the present disclosure will be described with reference to the drawings, in which.

DETAILED DESCRIPTION

Figure 1:
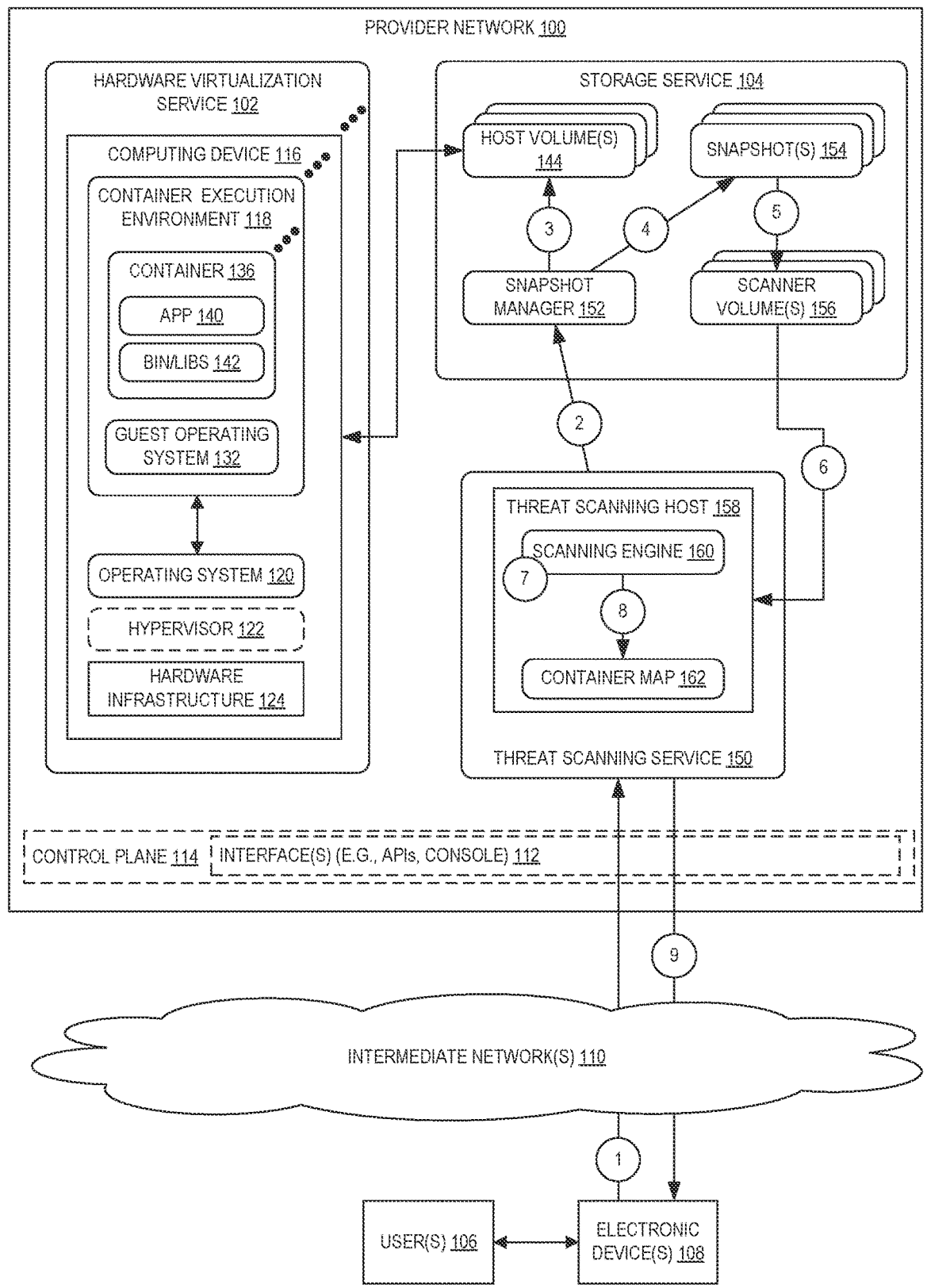
FIG. 1 is a diagram illustrating an environment for threat scanning transplanted containers according to some embodiments.

The present disclosure relates to methods, apparatus, systems, and non-transitory computer-readable storage media for threat scanning transplanted containers. The use of containers to develop and deploy software applications continues to increase in popularity. At a high level, containers are a method of operating system virtualization that allow users to run an application and its dependencies in resource-isolated processes and in a consistent manner across different deployment environments. To enable container-based applications to run consistently across various deployment environments, containers are constructed as atomic, self-contained packages of software that includes everything needed to run the software contained therein (that is, a container includes any necessary code, runtime, libraries, packages, and so forth). The use of containers has become a popular application development and deployment tool at least in part because containers are generally portable, lightweight, standardized, and easy to deploy in a consistent manner regardless of deployment environment.

A container image representing a containerized software application is often comprised of one or more "base" image layers which can be optionally "overlaid" with one or more user-created layers. The base image layers, for example, typically include various types of commonly used software applications such as operating systems, database servers, web-application frameworks, and so forth, upon which various types of user applications can be created. An example container image, for example, might include one base image layer including a popular operating system distribution, another base image layer including a popular open-source database server, and a user may overlay those images with a custom container image including user-created software that depends on the software contained in the underlying layers. A container image can be executed by a container runtime, which can be installed at a host operating system. Depending on the format of the container image, any of a number of available container runtimes can be used including, for example, container runtimes provided by the Docker® or other container platforms.

According to some embodiments, a threat scanning service scans customers' storage service volumes for threats by taking snapshots of the volumes and then mounting the snapshot volumes to a scanner instance. Along with the snapshot data, any custom purpose metadata or data on the volume will be 'transplanted' to the scanner instance, in particular container data and metadata (e.g., Docker, ContainerD, Kubernetes, or other container type data and metadata). The scanner instance can then use this container data and metadata to reconstruct a hierarchy of execution from the low level of files on the volume up to the high-level concepts of the container service clusters. By reconstructing this container hierarchy, the threat scanning service can map detected threats at the file level up to the cluster/task/service/workload/container resource it belongs to. This enables customers to easily pinpoint the compromised resource and perform appropriate remediation or mitigation actions.

FIG. 1 is a diagram illustrating an environment for threat scanning transplanted containers according to some embodiments. In some embodiments, a hardware virtualization service 102 and a storage service 104, among any number of other possible services, operate as part of a provider network 100 and each comprises one or more software modules executed by one or more electronic devices at one or more data centers and geographic locations. A user 106 using one or more electronic device(s) 108 (which may be part of or separate from the provider network 100) can interact with the various services of the service provider network 100 via one or more networks, such as the internet.

A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 110 (e.g., the internet) via one or more interface(s) 112, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 112 can be part of, or serve as a front-end to, a control plane 114 of the provider network 100 that includes "backend" services supporting and enabling the services that can be more directly offered to customers.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

An on-demand code execution service (referred to in various embodiments as a function compute service, functions service, cloud functions service, functions as a service, or serverless computing service) can enable customers of the provider network 100 to execute their code on cloud resources without having to select or manage the underlying hardware resources used to execute the code. For example, a customer can use the on-demand code execution service by uploading their code and use one or more APIs to request that the service identify, provision, and manage any resources required to run the code. In various embodiments, a "serverless" function can include code provided by a user or other entity—such as the provider network itself—that can be executed on demand Serverless functions can be maintained within a provider network by an on-demand code execution service and can be associated with a particular user or account, or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources can be maintained in a "ready" state (e.g., having a pre-initialized runtime environment configured to execute the serverless functions), allowing the serverless functions to be executed in near real-time.

The hardware virtualization service 102 (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some embodiments, the execution of compute instances is supported by a lightweight virtual machine manager (VMM). These VMMs enable the launch of lightweight micro-virtual machines (microVMs) in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

A container service can be a container orchestration and management service (referred to in various implementations as a container service, cloud container service, container engine, or container cloud service) that allows users of the cloud provider network to instantiate and manage containers. In some embodiments the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, workload, service, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

As shown in FIG. 1, hardware virtualization service 102 enables users 106 of the provider network 100 to provision and manage compute resources such as virtual machine instances. For example, the user may offer one or more services that are hosted by instances running on computing devices 116 of hardware virtualization service 102. Some of these services may be implemented using one or more containers which may be provided by the user, obtained from a container service, or other source. For example, the hardware virtualization service may provision a computing device 116 to support one or more container execution environments (for example, container execution environments 118). The provisioning of a new computing device 116 can include initially launching an operating system 120 to be used to support the one or more container execution environments 118 and other operations of the computing device 116. As shown in FIG. 1, the operating system 120 can be a guest operating system of a hypervisor 122 running on and abstracting the hardware infrastructure 124 of the computing device 116A; in other examples, the operating system 120 can be a standalone operating system running in a non-virtualized environment. Alternatively, as discussed, the containers may be implemented to run on a bare metal computing device or an offload card. Although the example of FIG. 1 is discussed with respect to a single computing device hosting a single execution environment, in various embodiments container service 102 may include a plurality of computing devices which may each host one or more execution environments. As shown, the container execution environment 118 may include one or more containers 136 (for example, the container 136 including application code 140 and any dependent binaries and libraries 142). Additionally, a container execution environment can include a separate guest operating system 132.

In some embodiments, a given computing device 116 may include local storage and may also include one or more block storage volumes provided by a storage service 104. The storage service 104 may make storage volumes, such as block storage volumes) available to hosts in hardware virtualization service 102. These volumes may be mounted as storage volumes on the host and appear to the host as local storage. This makes the customer's data highly available and highly durable and also enables the customer to scale their available storage as their needs change. For example, computing device 116 may have one or more host volumes 144 mounted thereto, which are available for storing data by computing device 116 and any applications, services, etc. executing thereon. As shown, the host volumes 144 are maintained by storage service 104 and may be dynamically increased or decreased in size based on demand, or more or fewer volumes may be made available as needed. Although the example of FIG. 1 shows host volumes 144 as discrete in storage service 104, in various embodiments the data stored to the host volumes may be stored across one or more physical storage devices and/or memory devices managed by storage service 104, and then presented to the computing device 116 as a single volume.

As shown in FIG. 1, a provider network may include a threat scanning service 150. Threat scanning service 150 may include a plurality of threat scanning hosts 158 which may each include a scanning engine 160 to scan customer data and/or provider network data for threats. For example, the scanning engine 160 can perform malware scanning based on various data available from a file system being scanned, such as files, event data, log data, etc. In some embodiments, the scanning engine may implement various threat scanning techniques, such as scanning for heuristics-based behavioral patterns, matching files to known threats or known safe files using threat lists/safe lists, etc. In some embodiments, at numeral 1, a user 106 can access threat scanning service 150 via electronic device 108 and enable threat scanning for their resources (e.g., the computing device, cluster of computing devices, instance(s), cluster of instances, etc. hosting their application(s), service(s), etc.). The user may provide account information associated with their resources and/or resource identifiers associated with the resources to be scanned. In some embodiments, the user may also grant security access (e.g., read access to the file systems of their resources) to the threat scanning service.

Once threat scanning has been enabled, at numeral 2, the threat scanning service can send a request to snapshot manager 152 of storage service 104 for a snapshot of at least one host volume 144 associated with a resource to be scanned. The host volume 144 may include a block storage volume, or data associated with a block storage volume, that is mounted to the resource to be scanned. The host volume may include data and/or metadata associated with the computing device, including the file system for the container execution environment and the corresponding container data and container metadata for each container running in the container execution environment. At numeral 3, the snapshot manager 152 may periodically, or on demand, generate snapshots 154 of volumes provided by storage service 104. The snapshot manager may maintain a plurality of snapshots 154 of each volume, as shown at numeral 4. In some embodiments, a snapshot may be generated relative to a previous snapshot and may capture only changes to the volume since the previous snapshot. A complete volume may be reconstructed from a plurality of snapshots that cover the history of the volume since it was deployed (or since snapshotting of the volume began). For example, at numeral 5, a copy of the host volume can be created as scanner volume 156 and mounted to the threat scanning host 158 at numeral 6.

Once mounted, scanning engine 160 can begin scanning the scanner volume 156 for malware. In some embodiments, in addition to threat scanning, the scanning engine may be responsible for vulnerability scanning. For example, the scanning engine may identify software that is out of date, has not been patched, or otherwise has or is likely to have known security vulnerabilities. When the scanning engine 160 identifies a likely threat, the scanning engine can determine a location of the file in the file system of the scanning volume (e.g., a path to the infected file in the file system). However, for volumes that include both host data and running containers, the path alone may not clearly indicate whether it is the host data that is infected, or data associated with one of the containers that is infected. This can make it more difficult for the customer to determine how to resolve the infection. For example, if a container is infected, then every host to which that container has been deployed may be at risk, and the remediation actions to be performed on infected data in a container may be different than for host data.

As such, embodiments may generate a container map 162. For example, when the scanner volume is first mounted, the scanning engine 160 can cause the container map to be generated. As discussed further below, the container map may be generated based on container metadata associated with the containers, the container execution environment, and/or the container service that generated the containers. In some embodiments, a map generator can read the container metadata and map the various container layers to their locations in the file system. Subsequently, when a threat is identified, the path of the threat can be compared to the container map 162 at numeral 8. If the threat is determined to be part of a container, then the threat scanning service 150 can determine which layer of the container includes the threat. Additionally, the threat scanning service 150 can determine the task/workload that the container is performing and the service to which that task/workload belongs. The techniques described herein may be used with various different types of containers which may use different terminology. For example, for Docker based containers, the threat scanning service may determine tasks associated with the container when building the overall service hierarchy, while for Kubernetes based containers, the threat scanning service may determine workloads associated with the containers when building the overall service hierarchy. Additionally, embodiments may also be applied to at least some on-demand code execution services which may be implemented via containers and/or lightweight virtual machines that may be similarly traced to identify infections within the on-demand code execution service.

Figure 2:
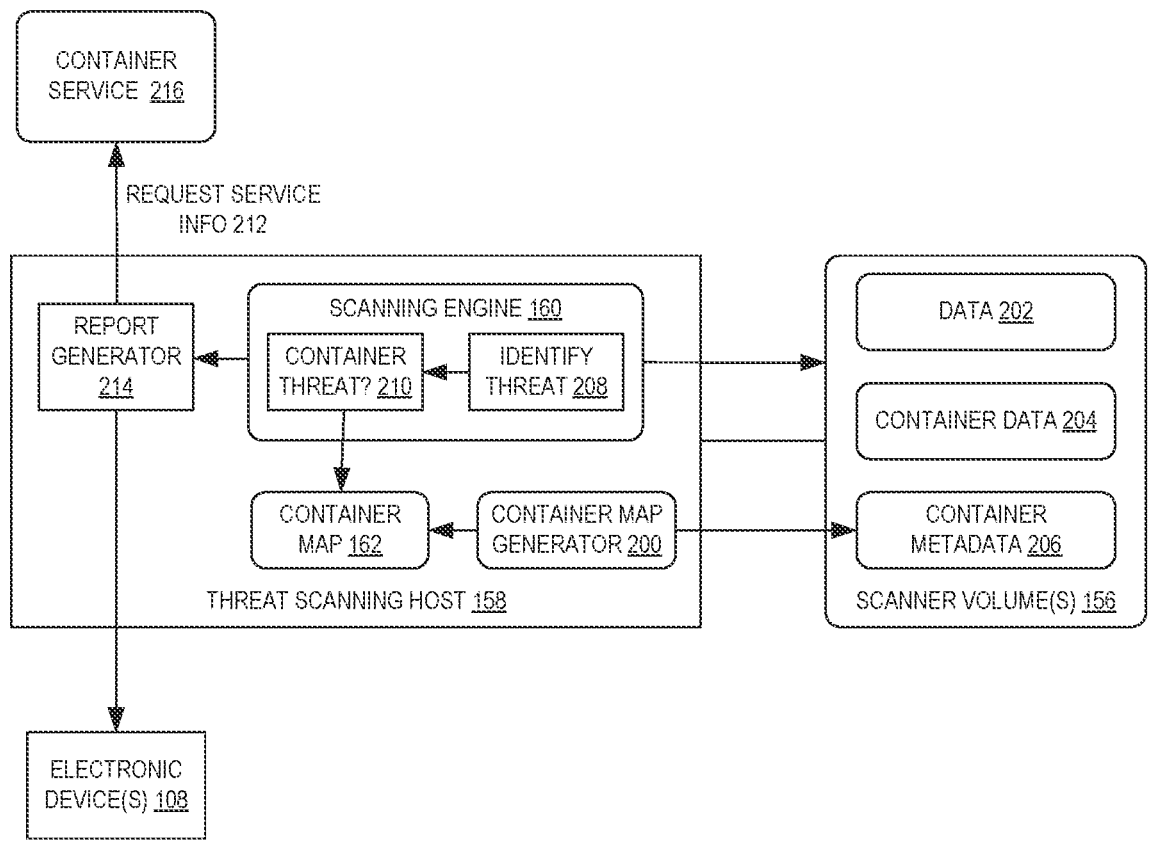
FIG. 2 is a diagram illustrating a threat scanning instance according to some embodiments.

FIG. 2 is a diagram illustrating a threat scanning instance according to some embodiments. As discussed, a threat scanning host can include a scanning engine 160 and a container map generator 200. As discussed, the host volume includes data associated with the host and the data associated with the container runtime. For example, the host volume may include customer data or other data 202 in addition to container-specific data and metadata associated with the container runtime. The container runtime data may include container data 204 and container metadata 206 for all the containers running in the container runtime on that host. The container data 204 may include the underlying file system data used by the container while it is running and the container metadata may include container configuration, layer layout, etc. A a snapshot of the host volume includes all of this data 202, container data 204, and container metadata 206. When a scanner volume 156 is created from such a snapshot and mounted to the threat scanning host, this data and metadata is effectively "transplanted" to the threat scanning host 158.

When a scanner volume is mounted to the threat scanning host, a container map generator 200 can scan the scanner volume for the container data 204 and the container metadata 206. In some embodiments, the container map generator can first determine what type of containers are in use. For example, a Docker container runtime may have different data and metadata (or differently formatted/organized data and metadata) than a Kubernetes container runtime, etc. The container map generator 200 can then identify the container metadata and parse the metadata to generate container map 162. For example, for a Docker runtime, the container map generator 200 can identify a 'containers' folder on the scanner volume which includes metadata for each container managed on the host where the corresponding host volume was originally mounted. In some embodiments, the metadata may be organized by container, with each container associated with an identifier. For example, a hash, such as a SHA256 hash, of each container may serve as the container ID.

The metadata can be used by the container map generator 200 to identify all of the layers of a particular container and how they are connected, as well as where the running version of the container is mounted in the file system. For example, the container metadata 206 may include a 'layerdb,' 'layer database,' or similar folder or file which indicates the folder mounts for all running containers managed by the container runtime. Additionally, within the metadata for a particular container is a file, such as 'lower' in Docker, which indicates the immediate previous layer, the base layer, and possibly any intervening layers. This might include an identifier for the layer, or may include an abbreviated identifier that is indexed to the actual layer identifier elsewhere in the metadata. In some embodiment, the container metadata 206 may include a 'driver' folder which maps the current state of each container to a mount location. Additionally, an 'overlay2' (or other container file system) folder which links to the underlying file system locations for the container data in the volume. This enables the mount points for each container and the container layers to be identified and added to the container map. In some embodiments, Kubernetes-based containers may be organized differently. For example, the Kubernetes container service may add metadata and/or label data to each container. As such, the metadata may be included in the container data for these containers. However, once this metadata is extracted, then it can be similarly parsed to generate the container map.

As such, the layout of a given container can be reconstructed using the container metadata. As discussed, the container map generator 200 identifies the running containers in the container metadata 206. In some embodiments, running containers may refer to those containers that were running when the snapshot was taken. Then for each container, the container map identifies each layer of the container from the container metadata 206. This is compiled into container map 162, such that the layout of each container, along with the location for each layer's data in the file system of the scanner volume is listed in the container map.

The scanning engine 160 then scans the scanner volume 156 for threats, vulnerabilities, etc. When the scanning engine identifies a threat at 208 (e.g., through heuristics matching, threat list match, or via other threat scanning techniques), the threat may correspond to data 202, container data 204, or (less likely) container metadata 206. The path of the threat (e.g., its location in the file system of the scanner volume) can be used by the scanning engine 160 along with the container map 162 to determine whether the threat is a container threat at 210. For example, does the path to the threat include a mount point of any of the layers of a container in the container map. If not, then the threat is noted and an alert, report, or other notification can be provided to the customer. However, if the threat is a container threat, then additional container information can be determined to generate a threat report for the customer.

Most often, if a threat is found in a container, it is found in the current state of the container and not an early layer or snapshot. In some embodiments, the infected layer of the container is identified based on the container map. Additionally, each layer includes a 'diff' file or folder which indicates what has changed relative to the previous layer of the container. The scanning engine 160 can check the diff folder for the identified threat. If it is not in the diff folder, then it was not modified relative to the previous layer and therefore was infected in the previous layer. The scanning engine can continue to iterate through the layers until the layer is found where the identified threat was introduced or modified, or until the base layer is reached. This allows for the specific infected layer of the container to be identified. Additionally, the service associated with the infected container can also be identified. In some embodiments, this may be performed by scanning engine 160. Alternatively, scanning engine 160 may indicate the infected container and layer of the container to report generator 214. Report generator 214 can send one or more requests to hardware virtualization service 102 to get additional information about the host being scanned.

In some embodiments, the report generator 214 sends an application programming interface (API) request to a container service 216 for service information 212. Container service 216 may manage containers (e.g., Docker-based containers, Kubernetes-based containers, etc.) running on one or more hosts (e.g., as provided by a hardware virtualization service in FIG. 1). For example, the request may be for a list of all tasks or workloads that the infected container is being used to process. The same, or a different request, may be for what tasks or workloads are associated with each service running on the host. The list of tasks or workloads associated with the infected container can then be cross referenced with the list of tasks or workloads associated with each service to determine which service or services the infected container is associated with.

For example, in some embodiments, the threat scanning service can send a request to container service 216 for a list of all tasks or workloads associated with the customer's account. The resulting list of task or workload identifiers can be used to look up a list of containers associated with that identifier. For example, each task or workload identifier may be an object with attributes that indicate the containers being used to execute that task or workload. Using the task or workload data and the container data, a map of the customer's fleet can be generated. This can then be queried using the container identifier of the infected container to determine which tasks or workloads use the infected container. This information can then be added to the threat detection report generated by report generator 214. Alternatively, in some embodiments, the container service 216 may add labels to each container it is managing. This label data may include a workload identifier that indicates the workload that is using the labeled container. In such instances, the container service 216 does not need to be queried to obtain the workload information. Additionally, in some embodiments, tasks or workloads may be executed as part of a cluster. Cluster-level information can be obtained by sending another API request to container service 216.

Once this service information is obtained, a threat detection report is generated that includes the infected container and details about the infected layers of the container, along with the service(s) that are impacted by the infected container. This report is then returned to the customer via electronic device 108. In some embodiments, the threat detection report may be pushed, sent as an alert, or otherwise communicated to the customer based on alert policies defined by the customer. In some embodiments, the type of alert sent may vary depending on the type of threat detected. In some embodiments, in addition to the report, the threat scanning host may cause the infected container to be terminated on the host. This then eliminates the detected threat from the host. A new container may then be redeployed to the host which may be free of infection (depending on how the container was originally infected).

Figure 3:
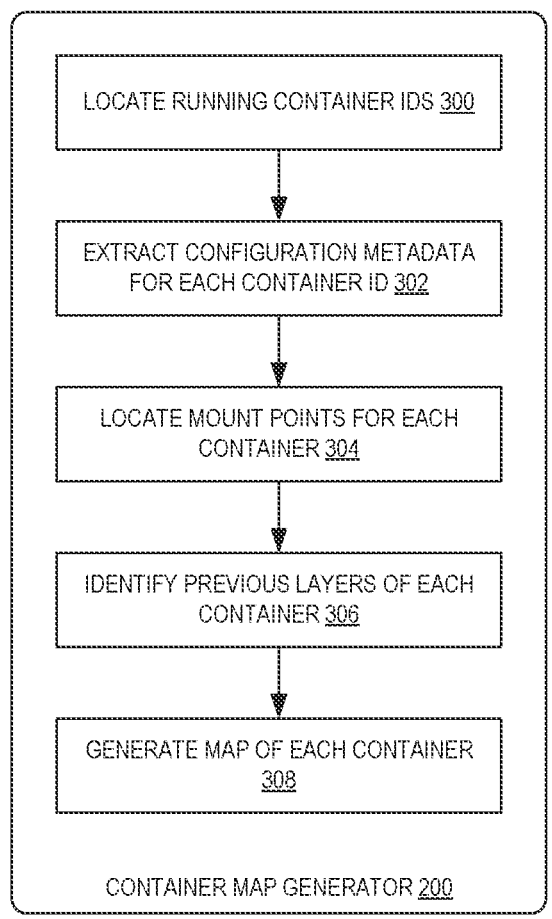
FIG. 3 is a diagram illustrating a container map generator according to some embodiments.

FIG. 3 is a diagram illustrating a container map generator according to some embodiments. As discussed, the container map generator 200 is responsible for parsing container metadata to generate a container map. As shown in FIG. 3, the container map generator can first locate a list of running container identifiers 300. As discussed, in some embodiments, the container metadata may include a folder of running container identifiers. These may be cryptographic hashes generated from container data (e.g., a container name or other data specific to the container). Using the container identifiers, configuration metadata can be extracted 302. For example, the container metadata may include a 'containers' folder that includes a plurality of folders, one corresponding to each container ID. Each of these folders may include metadata specific to that container.

As discussed, the container metadata for each container includes information that can be parsed to identify where that container's data is stored on the volume. For example, mount points can be located for each container in its corresponding metadata 304, such as in the 'layerdb' folder or other similar structure in the container metadata. Additionally, each layer includes a file that points to a previous layer and a base layer of the container. Using this file, each layer can be traced back to its base layer 306. By combining the list of layers of each container and their mount points, the map of each container is generated 308.

Figure 4:
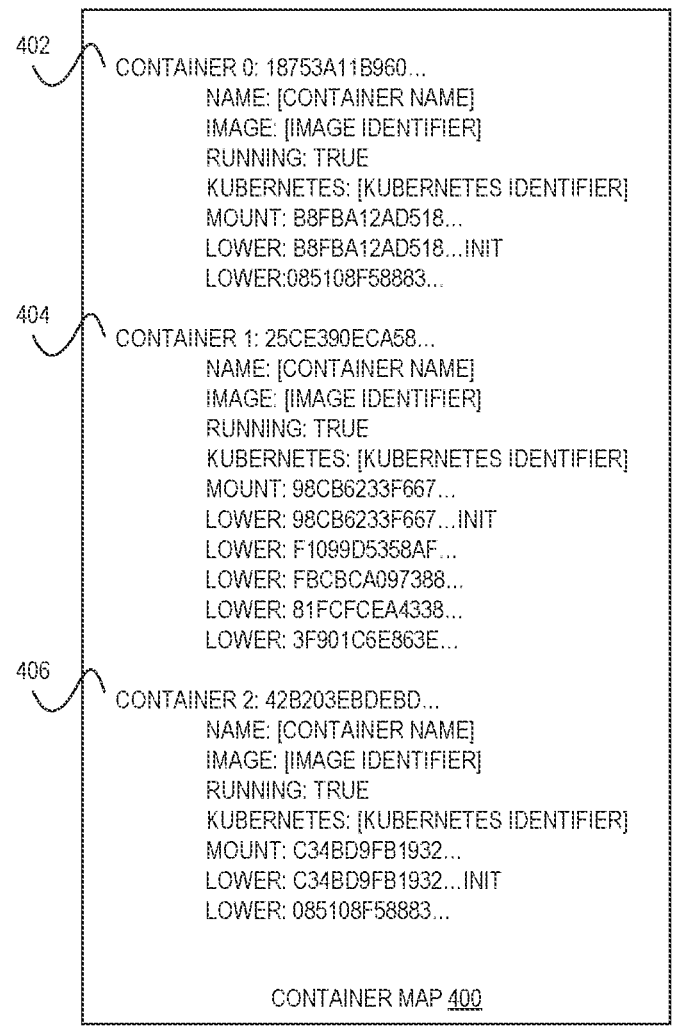
FIG. 4 is a diagram illustrating an example container map according to some embodiments.

FIG. 4 is a diagram illustrating an example container map according to some embodiments. As shown in FIG. 4, a container map 400 can include the one or more containers running on the host being scanned (e.g., whose data is stored on the volume being scanned). For example, in the example container map 400 of FIG. 4, three containers are running on the host: container 0 402, container 1 404, and container 2, 406. For each container in the container map, the container ID is listed along with the container name, image identifier, a running flag (e.g., indicating whether the container is running on the host), a Kubernetes identifier, if applicable, and the layers of the container. For example, container 0 402 includes the current state at mount, and two lower layers, container 1 404 includes the current state at mount, and five lower layers, and container 2 406 includes the current state at mount and two lower layers. In some embodiments, the mount and lower layers of each container in the container map indicate the file system locations of the data associated with those containers/layers. When a new threat is identified, the path associated with the threat is compared to the locations of the containers/layers in the container map 400 and, if there is a match, the threat is identified as a container threat. In some embodiments, each folder in the path of the threat can be checked against the container map to determine whether the threat is included in a particular container.

Figure 5:
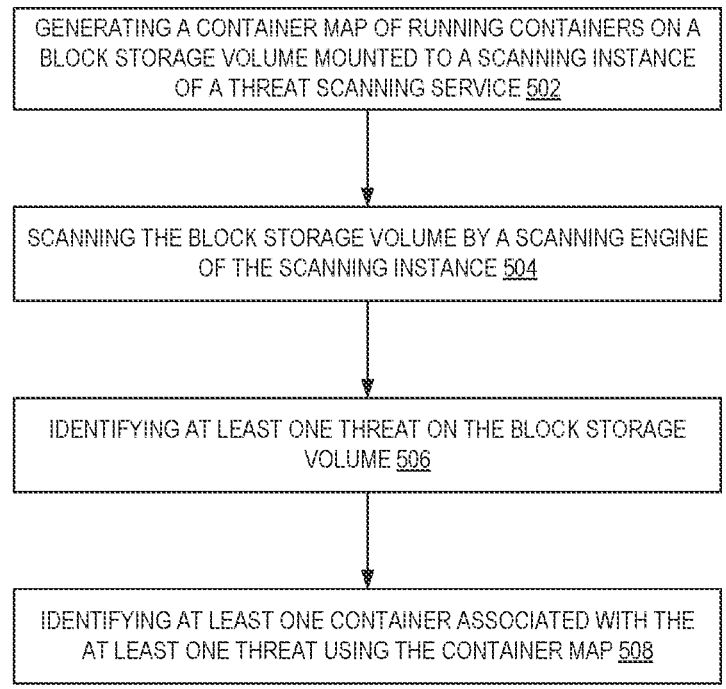
FIG. 5 is a flow diagram illustrating operations of a method for threat scanning transplanted containers according to some embodiments.

FIG. 5 is a flow diagram illustrating operations 500 of a method for threat scanning transplanted containers according to some embodiments. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 500 are performed by threat scanning service 150 or storage service 104 of the other figures.

The operations 500 include, at block 502, generating a container map of running containers on a block storage volume mounted to a scanning instance of a threat scanning service. In some embodiments, the container map maps storage locations on the block storage volume to the running containers or layers of the running containers.

The operations 500 further include, at block 504, scanning the block storage volume by a scanning engine of the scanning instance. For example, the scanning engine may implement various threat scanning techniques, such as matching threats against threat lists (e.g., hash-based threat matching), heuristics-based behavior threat matching, or other techniques.

The operations 500 further include, at block 506, identifying at least one threat on the block storage volume. For example, a file on the block storage volume may match a known threat. Additionally, or alternatively, the behavior observed by a file, piece of code, application, etc. may match a known threat pattern.

The operations 500 further include, at block 508, identifying at least one container associated with the at least one threat using the container map. In some embodiments, identifying at least one container associated with the at least one threat using the container map, further includes determining a path in a file system of the block storage volume to the at least one threat, comparing the path to the storage locations of the running containers in the container map, and determining the path includes a first storage location of a first running container.

In some embodiments, the operations further include identifying container metadata on the block storage volume, wherein the container metadata is associated with a container runtime, obtaining identifiers associated with the running containers based on the container metadata, obtaining mount points in a file system of the block storage volume using the identifiers associated with the running containers and the container metadata, and generating the container map using the identifiers associated with the running containers and the mount points.

In some embodiments, the operations further include for each running container: determining a mount layer of the running container corresponding to a current state of the running container, iteratively determining a one or more lower layers from the mount layer based on metadata associated with that running container, and updating the container map to include the mount layer and the one or more lower layers and their corresponding mount points. In some embodiments, the operations further include tracing the at least one threat from a first layer of the container to one or more lower layers of the container based on the container map and the container metadata.

In some embodiments, the operations further include sending a first service application programming interface (API) request for a list of tasks associated with a customer account, determining a list of containers associated with each task from the list of tasks, and determining at least one task identifier associated with at least one task associated with the at least one container based on the list of tasks and the list of containers.

In some embodiments, the operations further include generating a threat detection report indicating the at least one container associated with the at least one threat to a customer associated with the at least one container, wherein the threat detection report further indicates the at least one service associated with the at least one container and at least one infected layer of the at least one container. In some embodiments, the operations further include requesting a snapshot of the block storage volume associated with a host to be scanned for threats, and mounting a copy of the block storage volume based on the snapshot to the scanning instance of the threat scanning service. In some embodiments, the operations further include determining a workload identifier associated with the at least one container based on one or more labels added to the at least one container's metadata by a container service, and generating a threat detection report indicating the at least one container associated with the at least one threat to a customer associated with the at least one container, wherein the threat detection report further indicates the at least one workload identifier associated with the at least one container and at least one infected layer of the at least one container.

In some embodiments, the operations include requesting a snapshot of at least one block storage volume associated with a host to be scanned for threats, mounting a volume based on the snapshot to a scanning instance of a threat scanning service, generating a container map which maps storage locations in a file system of the volume to one or more containers running on the volume, scanning the file system of the volume by a scanning engine of the scanning instance, identifying at least one threat on the volume, identifying at least one container associated with the at least one threat using the container map, and sending, by the scanning engine, a detection report indicating the at least one container associated with the at least one threat to a customer associated with the host. In some embodiments, scanning the volume by a scanning engine of the scanning instance, further comprises scanning the file system of the volume for vulnerabilities, and scanning the file system of the volume for threats. In some embodiments, identifying at least one container associated with the at least one threat using the container map, further comprises identifying the at least one threat in a file system location on the volume, and determining the file system location is associated with a layer of the at least one container using the container map.

Figure 6:
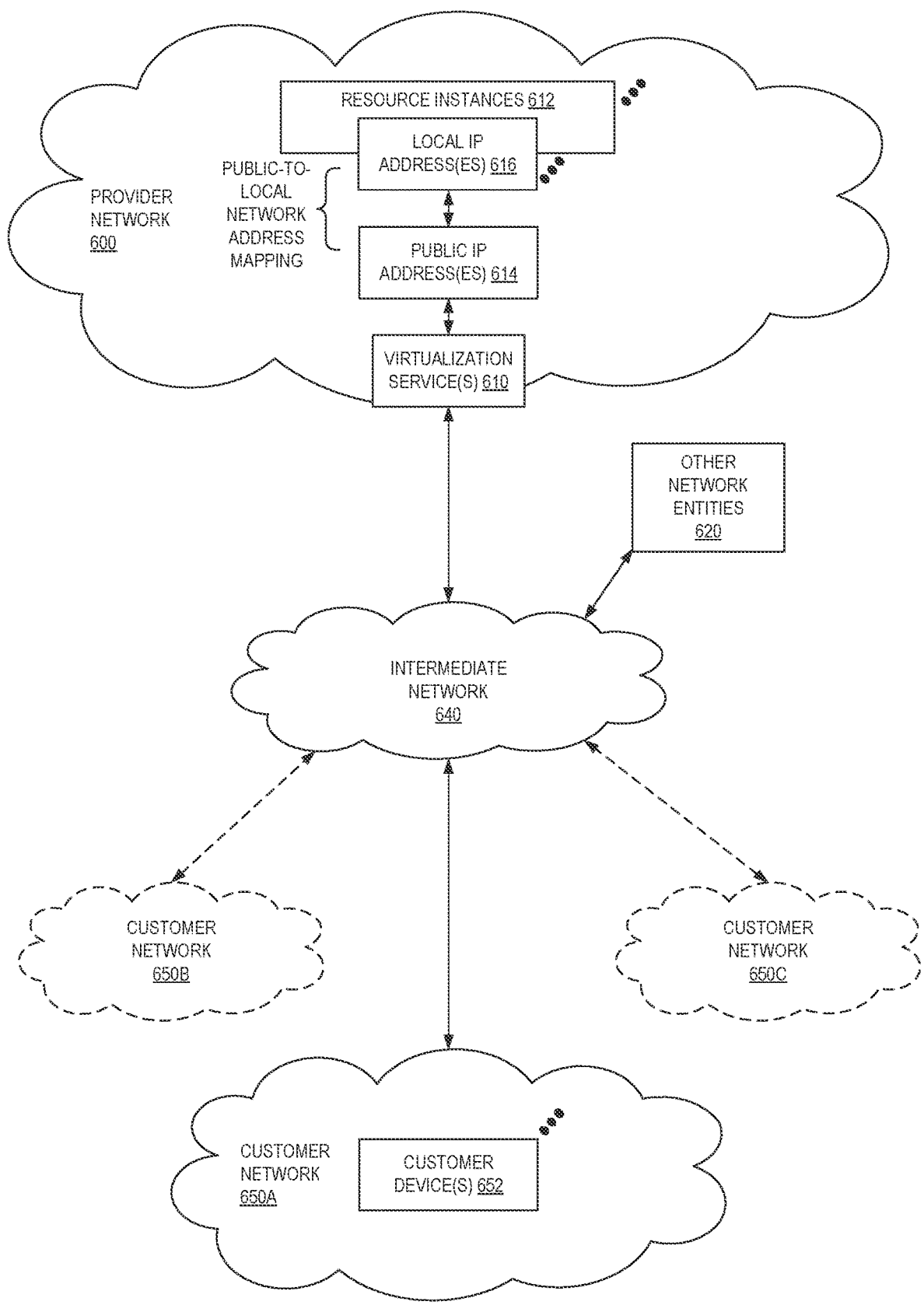
FIG. 6 illustrates an example provider network environment according to some embodiments.

FIG. 6 illustrates an example provider network (or "service provider system") environment according to some embodiments. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some embodiments, the provider network 600 can also provide public IP addresses 614 and/or public IP address ranges (e.g., Internet Protocol version 4 (IPv4) or Internet Protocol version 6 (IPv6) addresses) that customers can obtain from the provider 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
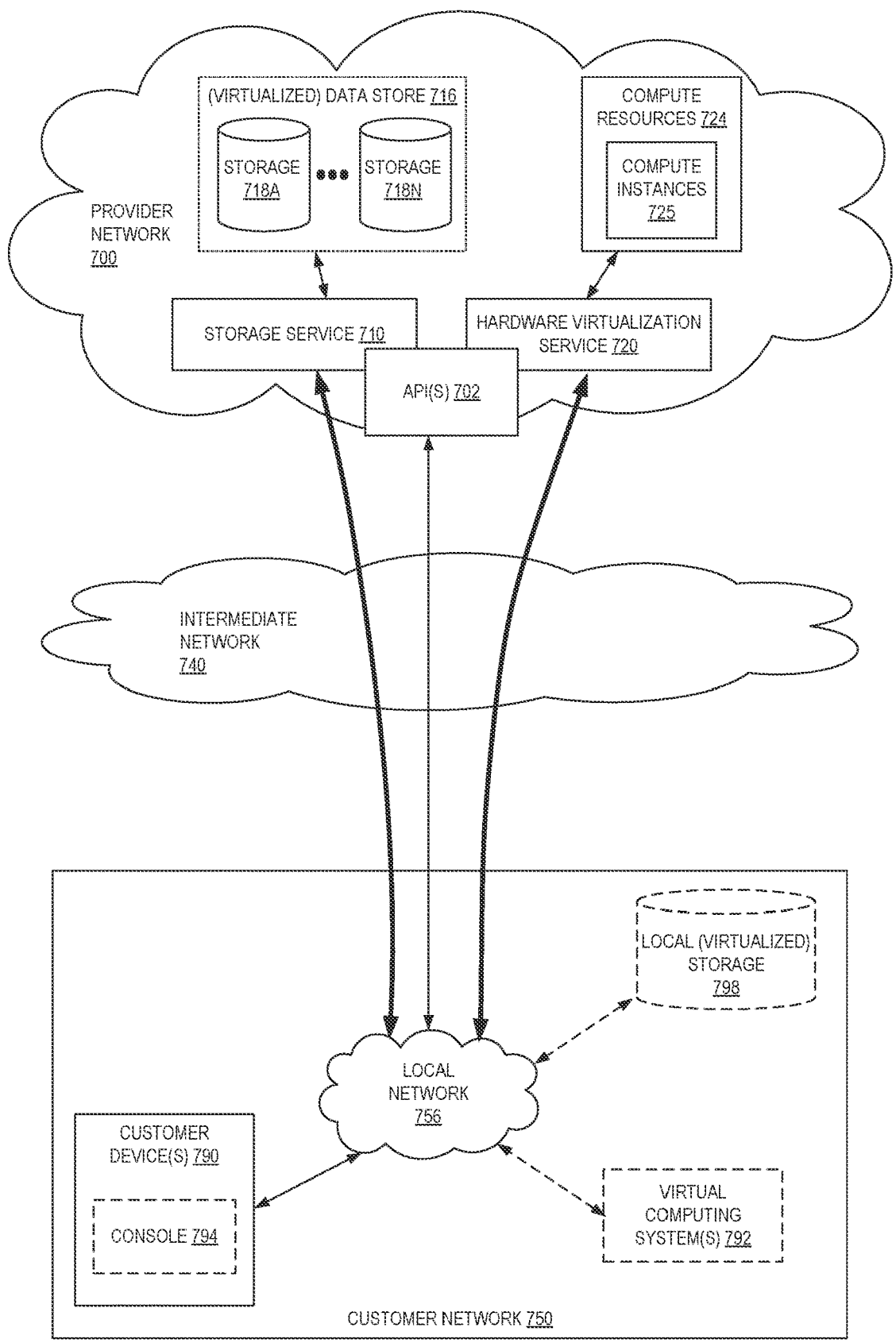
FIG. 7 is a block diagram of an example provider network that provides a storage service and a hardware virtualization service to customers according to some embodiments.

FIG. 7 is a block diagram of an example provider network environment that provides a storage service and a hardware virtualization service to customers, according to some embodiments. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740 and to the provider network 700. In some embodiments, the hardware virtualization service 720 can provide one or more APIs 702, for example a web services interface, via which the customer network 750 can access functionality provided by the hardware virtualization service 720, for example via a console 794 (e.g., a web-based application, standalone application, mobile application, etc.) of a customer device 790. In some embodiments, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some embodiments, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some embodiments, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s) 702 to request allocation of one or more resource instances within the virtual network or within another virtual network.

Illustrative Systems

Figure 8:
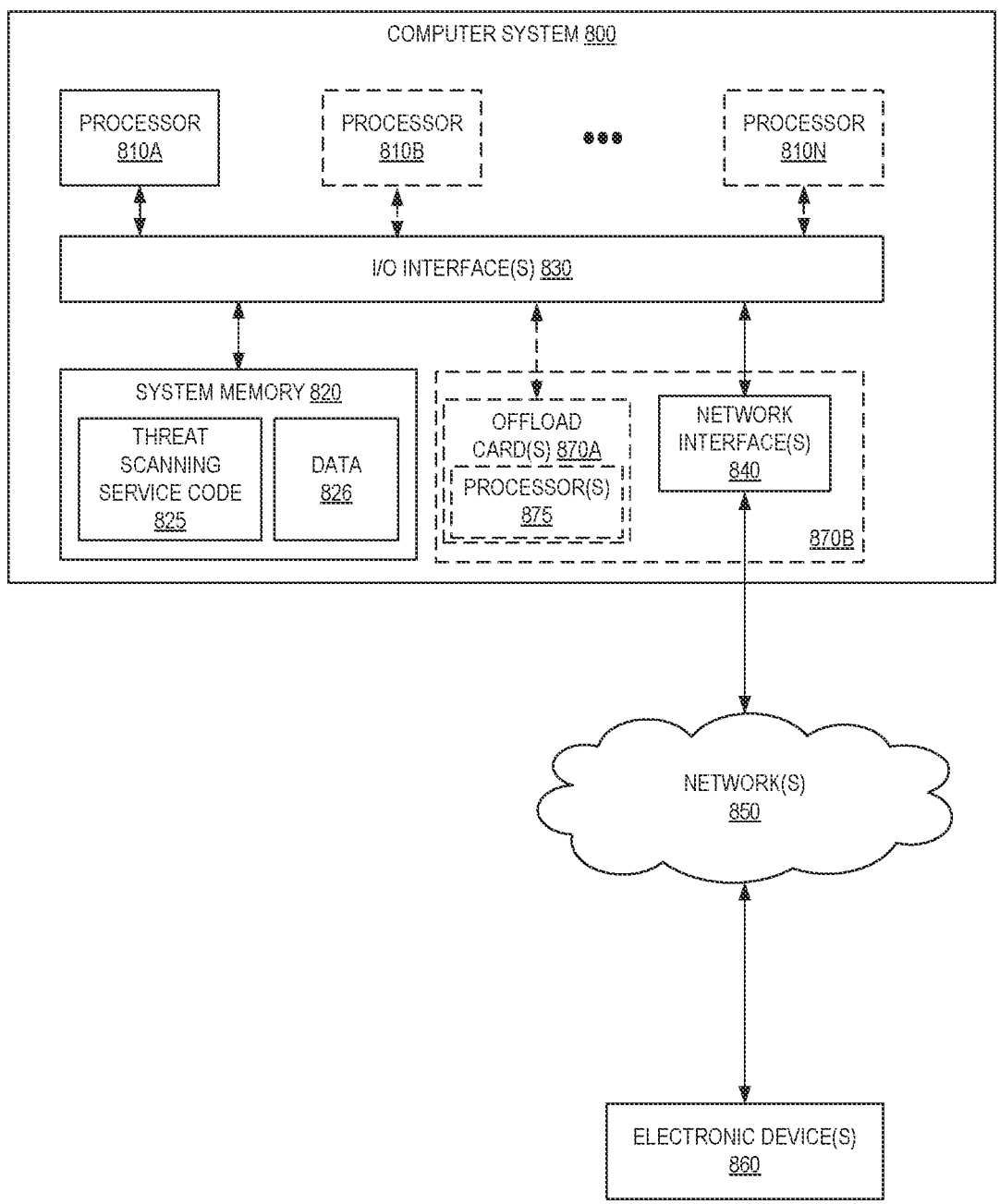
FIG. 8 is a block diagram illustrating an example computer system that can be used in some embodiments.

In some embodiments, a system that implements a portion or all of the techniques described herein can include a general-purpose computer system, such as the computer system 800 illustrated in FIG. 8, that includes, or is configured to access, one or more computer-accessible media. In the illustrated embodiment, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various embodiments the computer system 800 can include one computing device or any number of computing devices configured to work together as a single computer system 800.

In various embodiments, the computer system 800 can be a uniprocessor system including one processor 810, or a multiprocessor system including several processors 810 (e.g., two, four, eight, or another suitable number). The processor(s) 810 can be any suitable processor(s) capable of executing instructions. For example, in various embodiments, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various embodiments, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 820 as threat scanning service code 825 (e.g., executable to implement, in whole or in part, the threat scanning service 150) and data 826.

In some embodiments, the I/O interface 830 can be configured to coordinate I/O traffic between the processor 810, the system memory 820, and any peripheral devices in the device, including the network interface 840 and/or other peripheral interfaces (not shown). In some embodiments, the I/O interface 830 can perform any necessary protocol, timing, or other data transformations to convert data signals from one component (e.g., the system memory 820) into a format suitable for use by another component (e.g., the processor 810). In some embodiments, the I/O interface 830 can include support for devices attached through various types of peripheral buses, such as a variant of the Peripheral Component Interconnect (PCI) bus standard or the Universal Serial Bus (USB) standard, for example. In some embodiments, the function of the I/O interface 830 can be split into two or more separate components, such as a north bridge and a south bridge, for example. Also, in some embodiments, some or all of the functionality of the I/O interface 830, such as an interface to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various embodiments, the network interface 840 can support communication via any suitable wired or wireless general data networks, such as types of Ethernet network, for example. Additionally, the network interface 840 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations, such as pausing and/or un-pausing compute instances, launching and/or terminating compute instances, performing memory transfer/copying operations, etc. These management operations can, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and can not coordinate with (or service) any separate hypervisor.

In some embodiments, the system memory 820 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
   obtaining a snapshot of at least one block storage volume associated with a host;
   generating a scanner volume of the at least one block storage volume;
   mounting the scanner volume based on the snapshot to a scanning instance of a threat scanning service;
   generating a container map that maps storage locations in a file system of the scanner volume to one or more containers running in a container execution environment;
   scanning, by a scanning engine of the scanning instance, the file system of the scanner volume;
   identifying, by the scanning engine, at least one threat on the scanner volume;
   identifying, by the scanning engine using the container map, at least one container of the one or more containers associated with the at least one threat; and
   sending, by the scanning engine to a customer associated with the host, a detection report indicating the at least one container associated with the at least one threat.

2. The computer-implemented method of claim 1, wherein scanning the file system of the scanner volume further comprises:
   scanning the file system of the scanner volume for vulnerabilities; and
   scanning the file system of the scanner volume for threats.

3. The computer-implemented method of claim 1, wherein identifying, by the scanning engine using the container map, at least one container of the one or more containers associated with the at least one threat further comprises:
   identifying the at least one threat in a file system location on the scanner volume; and
   determining, using the container map, the file system location is associated with a layer of the at least one container.

4. A computer-implemented method comprising:
   generating a container map that maps storage locations in a file system of a block storage volume mounted to a scanning instance of a threat scanning service to running containers in a container execution environment;
   scanning, by a scanning engine of the scanning instance, the block storage volume;
   identifying, by the scanning engine, at least one threat on the block storage volume; and identifying, by the scanning engine using the container map, at least one container of the running containers associated with the at least one threat.

5. The computer-implemented method of claim 4, wherein the container map maps the storage locations in the file system of the block storage volume to layers of the running containers.

6. The computer-implemented method of claim 5, wherein identifying, by the scanning engine using the container map, at least one container of the running containers associated with the at least one threat further comprises:
   determining a path in the file system of the block storage volume to the at least one threat;
   comparing the path to the storage locations of the running containers in the container map; and
   determining the path includes a first storage location of the storage locations of a first running container of the running containers.

7. The computer-implemented method of claim 4, further comprising:
   identifying container metadata on the block storage volume, wherein the container metadata is associated with a container runtime;
   obtaining identifiers associated with the running containers based on the container metadata;
   obtaining mount points in the file system of the block storage volume using the identifiers associated with the running containers and the container metadata; and
   generating the container map using the identifiers associated with the running containers and the mount points.

8. The computer-implemented method of claim 7, further comprising:
   for each running container:
      determining a mount layer of the running container corresponding to a current state of the running container; and
      iteratively determining one or more lower layers from the mount layer based on metadata associated with that running container; and
   updating the container map to include the mount layer and the one or more lower layers and their corresponding mount points.

9. The computer-implemented method of claim 8, further comprising:
   tracing the at least one threat from a first layer of the running container to one or more lower layers of the running container based on the container map and the container metadata.

10. The computer-implemented method of claim 9, further comprising:
   sending a service request to an application programming interface (API) for a list of tasks associated with a customer account;
   determining a list of containers associated with each task from the list of tasks; and
   determining at least one task identifier associated with at least one task associated with the at least one container based on the list of tasks and the list of containers.

11. The computer-implemented method of claim 10, further comprising:
   sending a threat detection report indicating the at least one container associated with the at least one threat to a customer associated with the at least one container, wherein the threat detection report further indicates the at least one task identifier associated with the at least one container and at least one infected layer of the at least one container.

12. The computer-implemented method of claim 9, further comprising:
   determining a workload identifier associated with the at least one container based on one or more labels added to the at least one container's metadata by a container service; and
   sending a threat detection report indicating the at least one container associated with the at least one threat to a customer associated with the at least one container, wherein the threat detection report further indicates the at least one workload identifier associated with the at least one container and at least one infected layer of the at least one container.

13. The computer-implemented method of claim 4, further comprising:
   requesting a snapshot of the block storage volume; and
   mounting a copy of the block storage volume based on the snapshot to the scanning instance of the threat scanning service.

14. A system comprising:
   a first one or more electronic devices to implement a block storage service in a multi-tenant provider network; and
   a second one or more electronic devices to implement a threat scanning service in the multi-tenant provider network, the threat scanning service including one or more processors and memory storing instructions that upon execution by the one or more processors, cause the threat scanning service to:
      generate a container map that maps storage locations in a file system of a block storage volume managed by the block storage service to running containers in a container execution environment, the block storage volume mounted to a scanning instance of the threat scanning service;
      scan, by a scanning engine of the scanning instance, the block storage volume;
      identify, by the scanning engine, at least one threat on the block storage volume; and
      identify, by the scanning engine using the container map, at least one container of the running containers associated with the at least one threat.

15. The system of claim 14, wherein the container map maps the storage locations in the file system of the block storage volume to layers of the running containers.

16. The system of claim 15, wherein to identify, by the scanning engine using the container map, at least one container of the running containers associated with the at least one threat, the instructions, when executed by the one or more processors, further cause the threat scanning service to:
   determine a path in the file system of the block storage volume to the at least one threat;
   compare the path to the storage locations of the running containers in the container map; and
   determine the path includes a first storage location of the storage locations of a first running container of the running containers.

17. The system of claim 14, wherein the instructions, when executed by the one or more processors, further cause the threat scanning service to:
   identify container metadata on the block storage volume, wherein the container metadata is associated with a container runtime;

obtain identifiers associated with the running containers based on the container metadata;

obtain mount points in the file system of the block storage volume using the identifiers associated with the running containers and the container metadata; and generate the container map using the identifiers associated with the running containers and the mount points.

18. The system of claim 17, wherein the instructions, when executed by the one or more processors, further cause the threat scanning service to:

for each running container:

determine a mount layer of the running container corresponding to a current state of the running container; and iteratively determine one or more lower layers from the mount layer based on metadata associated with that running container; and update the container map to include the mount layer and the one or more lower layers and their corresponding mount points.

19. The system of claim 18, wherein the instructions, when executed by the one or more processors, further cause the threat scanning service to:

trace the at least one threat from a first layer of the running container to one or more lower layers of the running container based on the container map and the container metadata.

20. The system of claim 18, wherein the instructions, when executed by the one or more processors, further cause the threat scanning service to:

send a service request to an application programming interface (API) for a list of tasks associated with a customer account;

determine a list of containers associated with each task from the list of tasks; and determine at least one task identifier associated with at least one task associated with the at least one container based on the list of tasks and the list of containers.

* * * * *